(12) United States Patent
Mou et al.

(10) Patent No.: US 11,325,076 B2
(45) Date of Patent: May 10, 2022

(54) BATTERY HAVING SEPARATOR INCLUDING MESOPOROUS SILICA THIN FILM POSITIONED ON MACROPOROUS SUBSTRATE

(71) Applicant: NATIONAL TAIWAN UNIVERSITY, Taipei (TW)

(72) Inventors: Chung-Yuan Mou, Taipei (TW); Jingling Yang, Taipei (TW); Heng-Liang Wu, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 81 days.

(21) Appl. No.: 16/522,960

(22) Filed: Jul. 26, 2019

(65) Prior Publication Data

US 2020/0052277 A1 Feb. 13, 2020

Related U.S. Application Data

(60) Provisional application No. 62/718,382, filed on Aug. 14, 2018, provisional application No. 62/718,355, filed on Aug. 13, 2018.

(51) Int. Cl.
*B01D 71/02* (2006.01)
*B01D 71/34* (2006.01)
(Continued)

(52) U.S. Cl.
CPC ........... *B01D 71/027* (2013.01); *B01D 71/34* (2013.01); *B01D 71/36* (2013.01); *B01D 71/40* (2013.01);
(Continued)

(58) Field of Classification Search
CPC ............. H01M 50/449; H01M 50/431; H01M 50/411; B01D 71/34; B01D 71/36; B01D 71/40; B01D 71/54
(Continued)

(56) References Cited

U.S. PATENT DOCUMENTS

| | | | |
|---|---|---|---|
| 2009/0176162 A1* | 7/2009 | Exnar | H01M 10/058 429/336 |
| 2015/0147641 A1 | 5/2015 | Abd Elhamid et al. | |
| 2016/0240831 A1 | 8/2016 | Zeng et al. | |

(Continued)

FOREIGN PATENT DOCUMENTS

CN 103123958 A 5/2013

OTHER PUBLICATIONS

Wooten et al., Synthesis and Nanofillralion Membrane Performance of Oriented Mesoporous Silica Thin Films on Macroporous Supports, Aug. 2016, ACS Applied Materials and Interfaces, 8, 21806-21815 (Year: 2016).*

(Continued)

*Primary Examiner* — Sean P Cullen
(74) *Attorney, Agent, or Firm* — McClure, Qualey & Rodack, LLP

(57) ABSTRACT

A battery and a method of fabricating a porous membrane are disclosed. The battery includes an anode, a cathode, and a battery separator. The battery separator is positioned between the anode and the cathode and includes a macroporous substrate and a mesoporous silica thin film (MSTF) with perpendicular mesopore channels. The MSTF is positioned on the macroporous substrate. The method includes the following steps. A polymer film is formed on a macroporous substrate. A MSTF with perpendicular mesopore channels is grown on the polymer film. The polymer film is removed to form the porous membrane.

11 Claims, 15 Drawing Sheets

(51) Int. Cl.

| | | |
|---|---|---|
| B01D 71/40 | (2006.01) | |
| B01D 71/54 | (2006.01) | |
| B01D 71/36 | (2006.01) | |
| H01M 4/38 | (2006.01) | |
| H01M 10/0525 | (2010.01) | |
| H01M 10/0562 | (2010.01) | |
| H01M 10/0565 | (2010.01) | |
| H01M 50/411 | (2021.01) | |
| H01M 50/431 | (2021.01) | |
| H01M 50/449 | (2021.01) | |
| B82Y 30/00 | (2011.01) | |

(52) U.S. Cl.
CPC ............ *B01D 71/54* (2013.01); *H01M 4/386* (2013.01); *H01M 10/0525* (2013.01); *H01M 10/0562* (2013.01); *H01M 10/0565* (2013.01); *H01M 50/411* (2021.01); *H01M 50/431* (2021.01); *H01M 50/449* (2021.01); *B01D 2325/02* (2013.01); *B01D 2325/04* (2013.01); *B82Y 30/00* (2013.01)

(58) Field of Classification Search
USPC .................................................. 429/144, 145
See application file for complete search history.

(56) References Cited

U.S. PATENT DOCUMENTS

2018/0097217 A1* 4/2018 Danko ................. H01M 50/46
2018/0102526 A1   4/2018 Herle

OTHER PUBLICATIONS

"Perpendicular." Merriam-Webster.com Dictionary, Merriam-Webster, https://www.merriam-webster.com/dictionary/perpendicular. Accessed Jul. 13, 2021. (Year: 2021).*

Lintang et al, Fabrication of Mesoporous Silica/Alumina Hybrid Membrane Film Nanocomposites using Template Sol-Gel Synthesis of Amphiphilic Triphenylene, 2017, IOP Conference Series: Materials Science and Engineering, 202, 012003 (Year: 2017).*

* cited by examiner

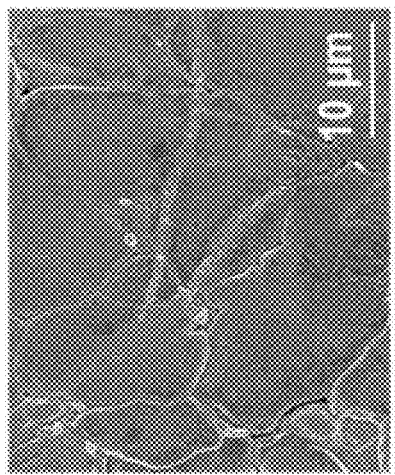
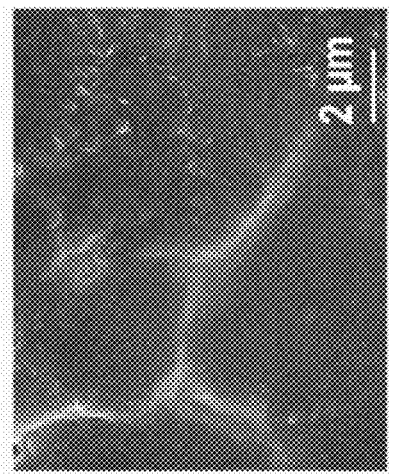
Fig. 9E
Fig. 9F

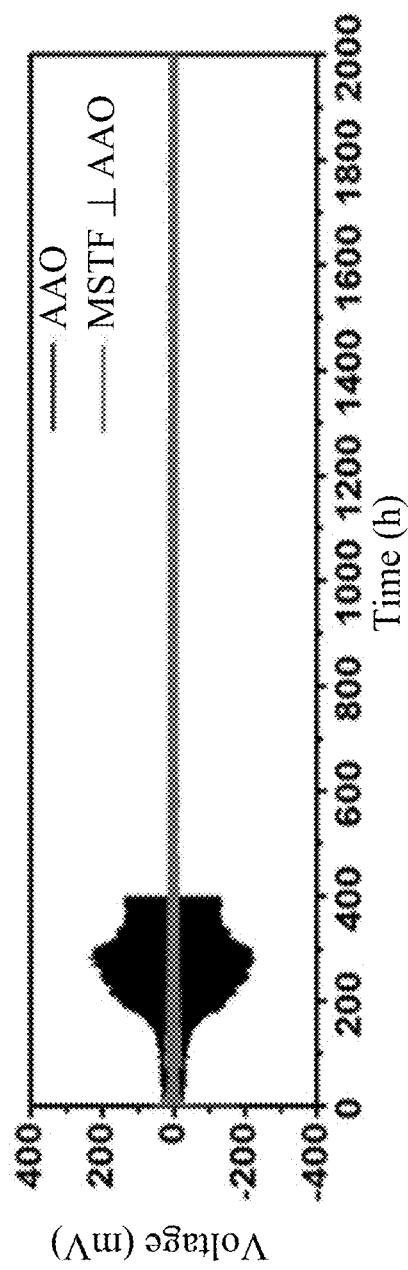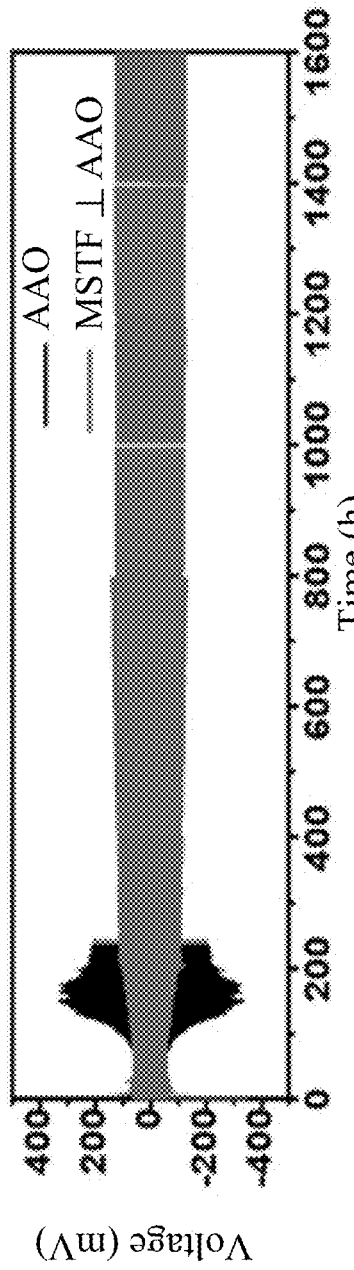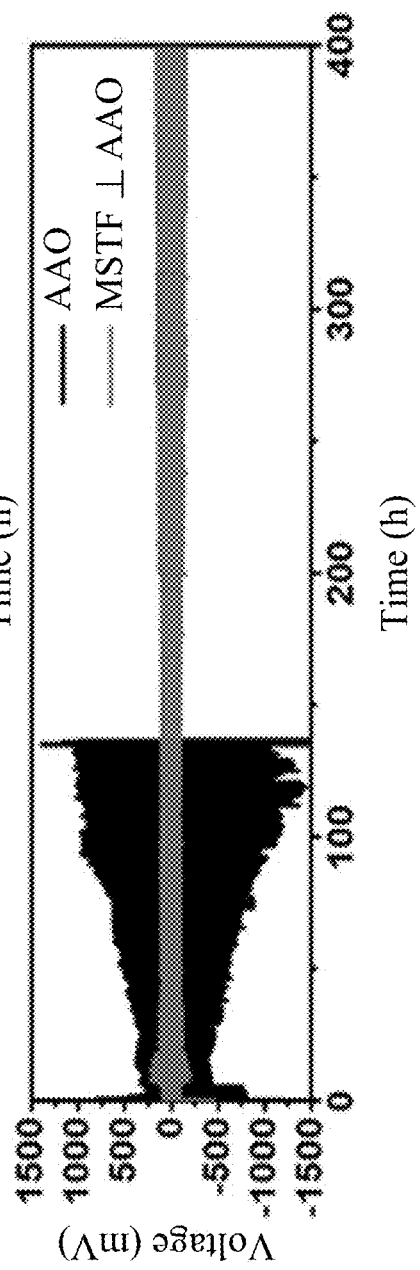
Fig. 10A
Fig. 10B
Fig. 10C

BATTERY HAVING SEPARATOR INCLUDING MESOPOROUS SILICA THIN FILM POSITIONED ON MACROPOROUS SUBSTRATE

CROSS-REFERENCE TO RELATED APPLICATION

This application claims priority to US Provisional Application Ser. No. 62/718,355, filed Aug. 13, 2018, and US Provisional Application Ser. No. 62/718,382, filed Aug. 14, 2018, the disclosures of which are incorporated by reference.

BACKGROUND

Field of Invention

The present disclosure relates to a battery and a method of fabricating a porous membrane. More particularly, the present disclosure relates to a battery including a battery separator which includes a macroporous substrate and a mesoporous silica thin film (MSTF) positioned thereon and a method of fabricating a porous membrane.

Description of Related Art

Rechargeable lithium ion batteries (LIBs) have attracted considerable attention over the previous two decades for a wide variety of applications such as portable energy devices. However, today's lithium ion batteries lack the higher capacity and longer life time required in transportation applications. Significantly, the use of Li metal anode in lithium metal batteries (LMBs) is the key component for long-range electrical vehicles and large electricity storage systems. Li metal has high specific theoretical capacity, but suffers from safety problems. For example, unstable Li deposition produces high-surface area dendritic structures at the anode/electrolyte interface, which causes the rapid consumption of the electrolyte, short-circuit, and spontaneous high-rate discharge of the batteries, resulting in rapid heating and explosion of the cell.

Therefore, there is a need to provide an effective strategy for design and operation of safe lithium batteries.

SUMMARY

The present disclosure provides a battery including an anode, a cathode, and a battery separator. The battery separator is positioned between the anode and the cathode and includes a macroporous substrate and a mesoporous silica thin film (MSTF) with perpendicular mesopore channels. The mesoporous silica thin film (MSTF) is positioned on the macroporous substrate.

In some embodiments, each mesopore channel of the MSTF has a pore size of more than or equal to about 2 nm, and less than or equal to about 10 nm.

In some embodiments, the MSTF has a thickness of more than or equal to about 10 nm, and less than or equal to about 100 nm.

In some embodiments, the MSTF has an area of more than or equal to about 0.5 cm$^2$, and less than or equal to about 100 cm$^2$.

In some embodiments, the macroporous substrate includes an inorganic material, a metal, a polymer, or a combination thereof.

In some embodiments, the inorganic material is selected from the group consisting of aluminum oxide, zirconia, titania, magnesia, spinel, calcia, cordierite, zeolite, mullite, ferrite, zinc oxide, silicon carbide, aluminum nitride, silicon nitride, titanium carbide, tungsten carbide, barium titanate, boron carbide, kaolin, and hydroxyapatite.

In some embodiments, the inorganic material includes an anodic aluminum oxide (AAO).

In some embodiments, the polymer is selected from the group consisting of polyvinylidene fluoride (PVDF), polyvinyl chloride (PVC), polyacrylonitrile (PAN), polymethyl methacrylate (PMMA), polyoxyethylene (PEO), polyamide (PAI), polytetrafluoroethylene (PTFE), and rubber.

In some embodiments, the macroporous substrate has macropores, and the macropores have an average pore diameter of more than or equal to about 20 nm, and less than or equal to about 1 μm.

In some embodiments, the macroporous substrate has a thickness of more than or equal to about 10 nm, and less than or equal to about 1 mm.

In some embodiments, the battery is a lithium battery or a rechargeable lithium battery.

The present disclosure provides a method of fabricating a porous membrane. The method includes the following steps. (i) A polymer film is formed on a macroporous substrate. (ii) A mesoporous silica thin film with perpendicular mesopore channels is grown on the polymer film. (iii) The polymer film is removed to form the porous membrane.

In some embodiments, the polymer film is formed by synthesizing the polymer film on the macroporous substrate.

In some embodiments, forming the polymer film on the macroporous substrate includes the following steps. A solution including polymers and a photoinitiator is coated on the macroporous substrate. The solution is irradiated with UV light to form crosslinked polymers to form the polymer film.

In some embodiments, the polymers comprise polystyrene (PS), poly(ethylene oxide) poly(propylene oxide) poly(ethylene oxide) triblock copolymer (PEO-PPO-PEO triblock copolymer, P123), polymethyl methacrylate (PMMA), or a combination thereof.

In some embodiments, the polymer film includes cross-linked polystyrene (PS), cross-linked poly(ethylene oxide) poly(propylene oxide) poly(ethylene oxide) triblock copolymer (PEO-PPO-PEO triblock copolymer, P123), cross-linked polymethyl methacrylate (PMMA), polyvinylidene fluoride (PVDF), or a combination thereof.

In some embodiments, the polymer film is removed by a heat treatment and an ozone clean.

In some embodiments, the heating treatment is performed at a temperature between about 300° C. and about 500° C.

In some embodiments, step (ii) is prior to step (i). In step (i), the polymer film is disposed between the macroporous substrate and the mesoporous silica thin film.

In some embodiments, the polymer film is removed by N-methyl-pyrrolidone (NMP) and an ozone clean.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows:

FIGS. 9E and 9F show surface SEM images of Li metal cycled in a Li—Li symmetric cell with MSTF⊥AAO separator at a fixed current density of 2 mA cm$^{-2}$ and a capacity of 1 mAh cm$^{-2}$ after 400 repeated Li plating-stripping cycles.

FIG. 10A shows the galvanostatic cycling performance of Li—Li symmetric cells with bare AAO and MSTF⊥AAO, respectively, cycled at a fixed current density of 3 mA cm$^{-2}$ and a capacity of 1.5 mAh cm$^{-2}$.

FIG. 10B shows the galvanostatic cycling performance of Li—Li symmetric cells with bare AAO and MSTF⊥AAO, respectively, cycled at a fixed current density of 10 mA cm$^{-2}$ and a capacity of 5 mAh cm$^{-2}$.

FIG. 10C shows the galvanostatic cycling performance of Li—Li symmetric cells with bare AAO and MSTF⊥AAO, respectively, cycled at a fixed current density of 20 mA cm$^{-2}$ and a capacity of 10 mAh cm$^{-2}$.

DETAILED DESCRIPTION

Figure 1A:
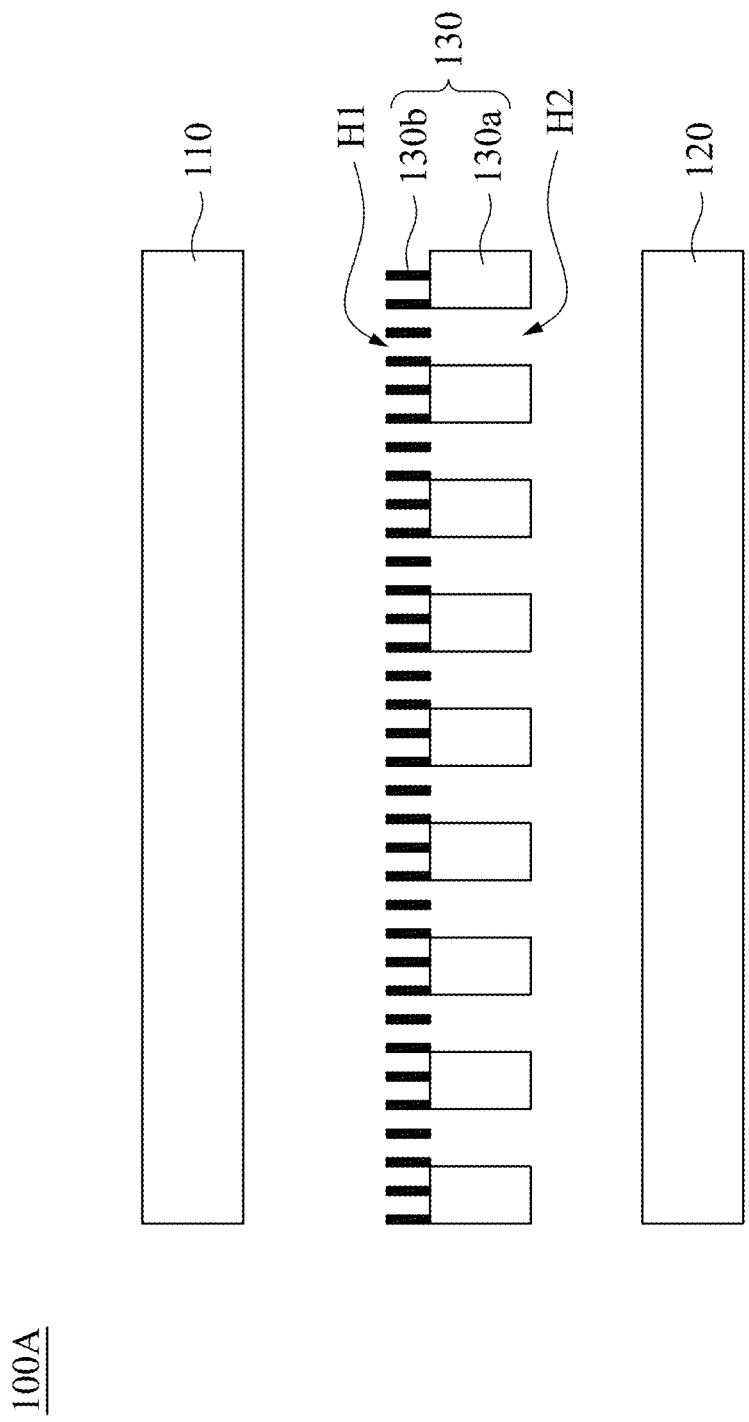
FIGS. 1A-1B respectively show cross-sectional views of a battery according to various embodiments of the present disclosure.

Reference will now be made in detail to the present embodiments of the, examples of which are illustrated in the accompanying drawings. Wherever possible, the same reference numbers are used in the drawings and the description to refer to the same or like parts.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

One aspect of the present disclosure provides a battery including a battery separator which includes a macroporous substrate and a mesoporous silica thin film (MSTF) with perpendicular mesopore channels, wherein the MSTF is positioned on the macroporous substrate. The battery separator of the present disclosure can effectively confine homogenous ion transport and thus stabilize electrodeposition of reactive metals (e.g. Li metal) at the anode/electrolyte interface, thereby resisting, impeding, suppressing, and/or preventing dendrite growth in the battery. Moreover, the battery separator can exhibit good dendrite-resistant ability under various current densities. The battery separator of the present disclosure can be applied in any battery which may have an anode on which dendrites can grow. The battery of the present disclosure is dendrite-resistant and can prevent the problems described previously. Further, the battery of the present disclosure is thermostable and exhibits long-term stability at various current densities. Moreover, compared to other battery with a single-layer macroporous separator or tradition separator (e.g, separator produced by Celgard LLC.), the battery of the present disclosure has better cycling ability.

Figure 1B:
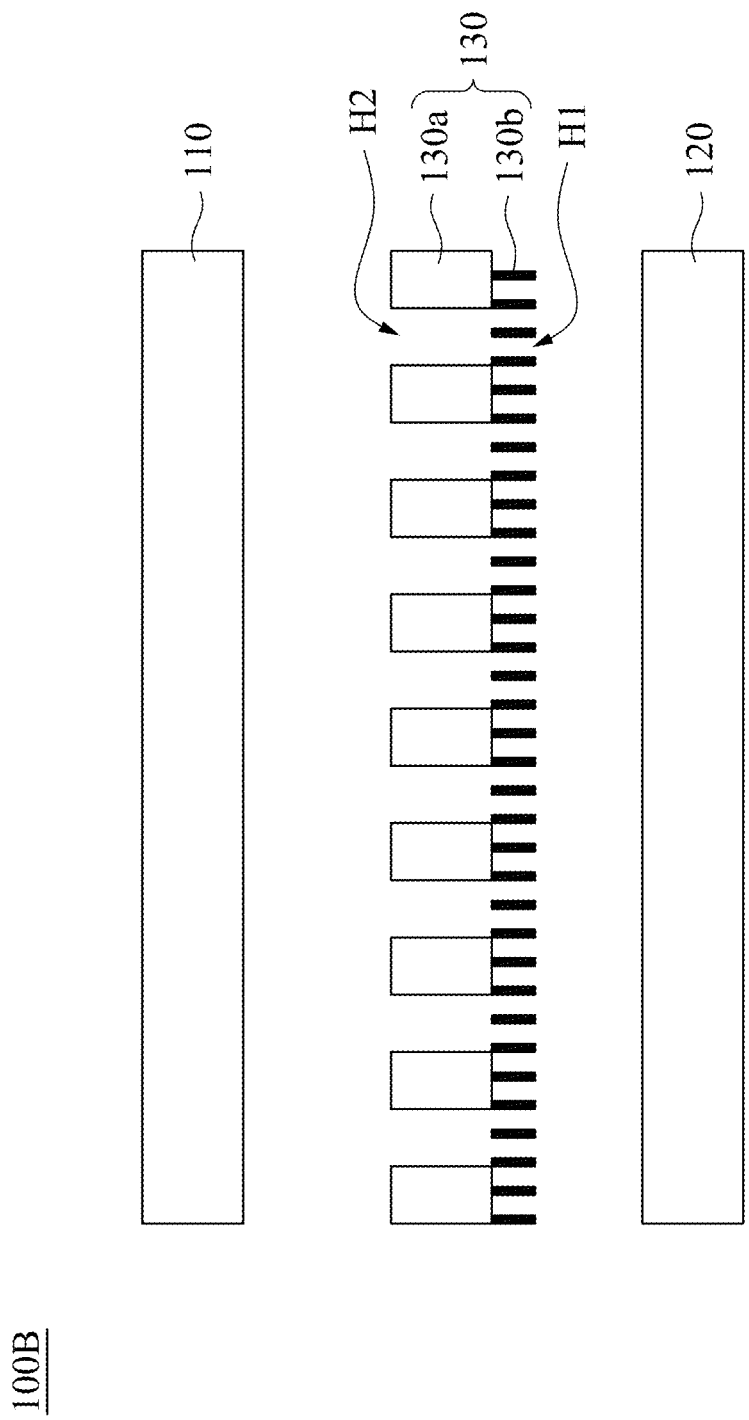

FIG. 1A shows a cross-sectional view of a battery 100A according to various embodiments of the present disclosure. The battery 100A includes an anode 110, a cathode 120, and a battery separator 130. The battery separator 130 is positioned between the anode 110 and the cathode 120. The anode 110 is separated from the cathode 120 by the battery separator 130. The battery separator 130 includes a macroporous substrate 130a and a mesoporous silica thin film (MSTF) 130b with perpendicular mesopore channels H1. These mesopore channels H1 are through nanochannels. The macroporous substrate 130a has macropores H2. The MSTF 130b is positioned on the macroporous substrate 130a, and between the macroporous substrate 130a and the anode 110. In some embodiments, the macroporous substrate 130a is in direct contact with the MSTF 130b. FIG. 1B shows a cross-sectional view of a battery 100B according to various embodiments of the present disclosure. The difference between the battery 100B and the battery 100A is that the MSTF 130b of battery 100B is positioned between the macroporous substrate 130a and the cathode 120 rather than between the macroporous substrate 130a and the anode 110.

Figure 2B:
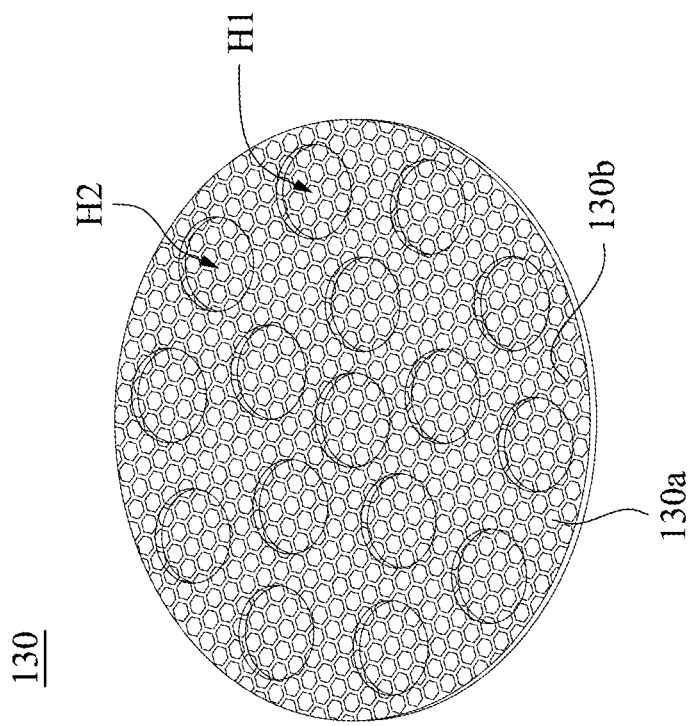
FIG. 2B shows the battery separator in FIG. 1A according to various embodiments of the present disclosure.
Figure 2A:
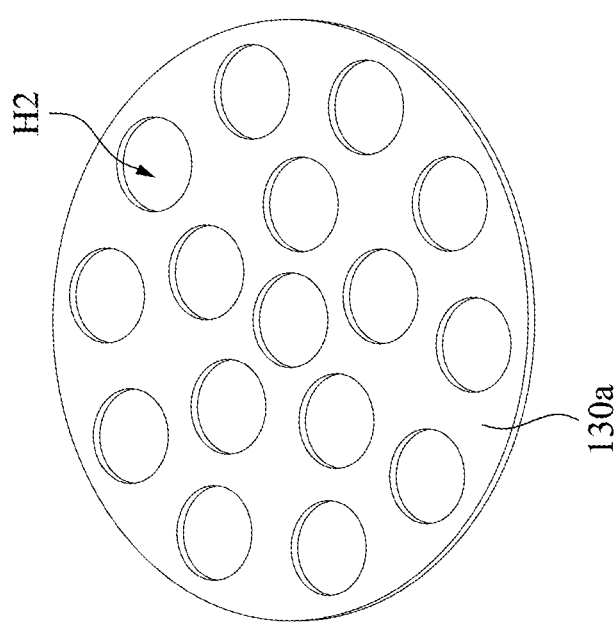
FIG. 2A shows the macroporous substrate in FIG. 1A according to various embodiments of the present disclosure.

FIG. 2A shows the macroporous substrate 130a in FIG. 1A according to various embodiments of the present disclosure. FIG. 2B shows the battery separator 130 in FIG. 1A according to various embodiments of the present disclosure.

In some embodiments, the battery 100A and the battery 100B are a lithium battery or a rechargeable lithium battery. For example, the rechargeable lithium battery is lithium ion battery (LIB), lithium metal battery (LMB), or lithium-sulfur (Li—S) battery, but not limited thereto. The battery separator 130 is a porous membrane and can confine homogenous Li ion transport, thereby being capable of resisting, impeding, suppressing, and/or preventing Li dendrite growth. The Li dendrite-resistant ability of the battery separator 130 is good under both general electric current densities and high current densities. With the mesopores confinement on Li-metal electrodeposition and Li ion transport, the ordered mesoporous silica thin film 130b with uniform perpendicular mesopore channels H1 provides effective strategy for design and operation of safe lithium batteries and rechargeable lithium batteries.

In some embodiments, the battery 100A or the battery 100B is disposed in a battery module. The battery module can be a laptop computer, a cellphones, a personal digital assistant (PDA), a digital music player, or a cordless power tool.

In some embodiments, each mesopore channel H1 of the MSTF 130b has a pore size of more than or equal to about 2 nm, and less than or equal to about 10 nm. For example, the pore size is 2.2 nm, 2.5 nm, 3 nm, 3.7 nm, 4 nm, 5 nm, 5.4 nm, 5.9 nm, 6 nm, 7 nm, 8 nm, or 9 nm, but not limited thereto. In some embodiments, the MSTF 130b has a thickness of more than or equal to about 10 nm, and less than or equal to about 100 nm. For example, the thickness of the MSTF 130b is 30 nm, 40 nm, 50 nm, 60 nm, 70 nm, 80 nm, or 90 nm, but not limited thereto. In some embodiments, the MSTF 130b has an area of more than or equal to about 0.5 $cm^2$, and less than or equal to about 100 $cm^2$. For example, the area of the MSTF 130b is 10 $cm^2$, 20 $cm^2$, 30 $cm^2$, 40 $cm^2$, 50 $cm^2$, 60 $cm^2$, 70 $cm^2$, 80 $cm^2$, or 90 $cm^2$, but not limited thereto.

In some embodiments, the macroporous substrate 130a includes an inorganic material, a metal, a polymer, or a combination thereof. In some embodiments, the inorganic material is selected from the group consisting of aluminum oxide, zirconia, titania, magnesia, spinel, calcia, cordierite, zeolite, mullite, ferrite, zinc oxide, silicon carbide, aluminum nitride, silicon nitride, titanium carbide, tungsten carbide, barium titanate, boron carbide, kaolin, and hydroxyapatite. In some embodiments, the inorganic material includes an anodic aluminum oxide (AAO). In some embodiments, the macroporous substrate 130a is an AAO substrate. In some embodiments, the polymer is selected from the group consisting of polyvinylidene fluoride (PVDF), polyvinyl chloride (PVC), polyacrylonitrile (PAN), polymethyl methacrylate (PMMA), polyoxyethylene (PEO), polyamide (PAI), polytetrafluoroethylene (PTFE), and rubber. In some embodiments, the macropores H2 of the macroporous substrate 130a have an average pore diameter of more than or equal to about 20 nm, and less than or equal to about 1 μm. For example, the average pore diameter of the macropores H2 is 50 nm, 100 nm, 200 nm, 300 nm, 400 nm, 500 nm, 600 nm, 700 nm, 800 nm, or 900 nm, but not limited thereto. In some embodiments, the macroporous substrate 130a has a thickness of more than or equal to about 20 nm, and less than or equal to about 1 mm. For example, the thickness of the macroporous substrate 130a is 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, or 1000 nm, but not limited thereto.

Another aspect of the present disclosure provides a method of fabricating a porous membrane. The method includes the following steps. (i) A polymer film is formed on a macroporous substrate. (ii) A mesoporous silica thin film (MSTF) with perpendicular mesopore channels is grown on the polymer film. (iii) The polymer film is removed to form the porous membrane. More specifically, the porous membrane includes the macroporous substrate and the MSTF with perpendicular mesopore channels thereon. The MSTF fabricated by the method is free of cracking defects and has uniform perpendicular mesopore channels. Moreover, by this method, large area MSTF can be produced. In some embodiments, the method is used for fabricating a centimeter-size MSTF. In some embodiments, the MSTF has an area of more than or equal to about 0.5 $cm^2$, and less than or equal to about 100 $cm^2$.

In some embodiments, the polymer film is formed by synthesizing the polymer film on the macroporous substrate. For example, the polymer film is formed by the following steps. A solution including polymers and a photoinitiator is coated on the macroporous substrate. The solution is irradiated with UV light to form crosslinked polymers to form the polymer film.

In some embodiments, the polymers comprise polystyrene (PS), poly(ethylene oxide) poly(propylene oxide) poly(ethylene oxide) triblock copolymer (PEO-PPO-PEO triblock copolymer, P123), polymethyl methacrylate (PMMA), or a combination thereof. In some embodiments, the polymer film includes cross-linked polystyrene (PS), cross-linked poly(ethylene oxide) poly(propylene oxide) poly(ethylene oxide) triblock copolymer (PEO-PPO-PEO triblock copolymer, P123), cross-linked polymethyl methacrylate (PMMA), or a combination thereof.

In some embodiments, the polymer film is removed by a heat treatment and an ozone clean. In some embodiments, the heating treatment is performed at a temperature between about 300° C. and about 500° C. For example, the temperature is 350° C., 400° C. or 450° C., but not limited thereto.

In some embodiments, step (ii) is prior to step (i). More specifically, a mesoporous silica thin film with perpendicular mesopore channels is grown on a polymer film. After that, the mesoporous silica thin film and the polymer film are transferred onto the macroporous substrate, wherein the polymer film is positioned between the macroporous substrate and the mesoporous silica thin film.

In some embodiments, the polymer film includes polyvinylidene fluoride (PVDF). In some embodiments, the polymer film is removed by N-methyl-pyrrolidone (NMP) and an ozone clean.

In some embodiments, the mesoporous silica thin film with the perpendicular mesopore channels is grown on the polymer film by the following steps. (i) The polymer film is immersed into an ammonia solution, wherein the ammonia solution includes a tertiary alkyl ammonium halide, alcohol, ammonium hydroxide, and a pore expending agent. (ii) A silica precursor is introduced into the ammonia solution. (iii) A heating step is performed to form the mesoporous silica thin film on the polymer film. In some embodiments, the tertiary alkyl ammonium halide is cetyltrimethylammonium bromide (CTAB). In some embodiments, the pore expending agent is selected from the group consisting of decane, ethyl acetate, hexadecane, silane polyethylene glycol, pentyl ether and a combination thereof. In some embodiments, the silica precursor includes tetraethyl orthosilicate, fumed silica, zeolite beta seeds, or a combination thereof. In some embodiments, the heating step is performed at a temperature between about 35° C. and about 80° C. For example, the temperature is 40° C., 45° C., 50° C., 55° C., 60° C., 65° C., 70° C., or 75° C., but not limited thereto.

Hereinafter, the present disclosure will be described in detail with reference to the embodiments and comparative examples in the present disclosure. However, the present disclosure is not limited to the following embodiments.

Example 1: Synthesis of a Dual-Layer MSTF/AAO Membrane by a Polymer Interlayer Method Firstly, polystyrene (PS), PEO-PPO-PEO triblock copolymer (P123) and polymethyl methacrylate (PMMA) were respectively used to produce a smooth surface layer on aluminum oxide (AAO) membranes with macropores for further growth of mesoporous silica thin film (MSTF). PS and P123 were dissolved in toluene under 50° C. for 1 h, respectively. PMMA was dissolved in anisole. Subsequently, 0.1 wt %-1 wt % photoinitiator was well dispersed into the solutions above. These solutions were used to spin-coat the AAO membranes (2.5 cm-4.7 cm in diameter, situated on a 5×5 cm² glass sheet) at 2000 rpm for 30 s, respectively. Then the cross-linking of the polymers on AAO surface were induced by the photoinitiator under UV light irradiation for 5 min-10 min. The spin-coated PS/AAO support and PMMA/AAO support were cured under 100° C. for 1 h-2 h afterwards, while P123/AAO support was stabilized at room temperature for 1 h-2 h, respectively.

Further growth of a mesoporous silica thin film (MSTF) on the top surface of each polymer film coated AAO membrane was conducted in an oil-in-water emulsion. The oil-in-water emulsion was prepared by mixing cetyltrimethylammonium bromide (CTAB) (0.965 g), ethanol (30.0 g) and a pore expending agent (either 3.0 mL of decane, or 3.1 mL of pentyl ether or 4.5 mL of hexadecane, or 1.2 mL of ethyl acetate, or 1.2 mL of ethyl acetate with the addition of 2.2 mL of silane polyethylene glycol) at 50° C. Then, the polymer film coated AAO membranes were directly immersed into the solution, followed by an introduction of $NH_3$ aqueous solution (7.5 g, 35.5 wt %), tetraethyl orthosilicate (TEOS)/ethanol solution (8.35 mL, 20% by volumes) under stirring at 50° C. overnight. The molar ratios of $CTAB:H_2O:NH_3:decane:ethanol:TEOS$ were calculated to be 1:8400:90:5.8:250:2.8. The synthesized MSTF/polymer film/AAO membranes were rinsed with ethanol, and then calcined in air atmosphere by heating from room temperature at rate of 1° C./min to 300° C.-500° C. and maintained at this temperature for 30 min-6 h, followed by UV ozone clean for 15 min-30 min. The polymer film and surfactant (e.g. CTAB) were removed by calcination and an ozone clean. After that, porous membranes including the AAO membrane and the MSTF with perpendicular mesopore channels freely standing on the AAO membrane were obtained.

Example 2: Synthesis of a Dual-Layer MSTF/AAO Membrane by a Polyvinylidene Fluoride (PVDF) Assistant Transfer Method Firstly, 10.0 wt % polyvinylidene fluoride (PVDF) was dissolve in acetone and dimethyl formamide mixed solution (acetone:dimethyl formamide=3:1 v/v) under the ultrasonic at 30° C. for 1 h. Then, the PVDF solution was spin-coated at 2000 rpm for 30 s on a 5×5 cm² glass sheet. Further solvent was evaporated at 60° C. for 1 h. Subsequently, MSTF was grown onto the PVDF film by the same procedures as mentioned in Example 1. Then, the synthesized MSTF/PVDF film/glass sheet was rinsed with ethanol three times. To remove the residual organic surfactants, the samples were immersing in a hydrochloric acid/ethanol (5 mg/ml, 50 mL) solution for 12 h-16 h under constant stirring, followed by washing the MSTF/PVDF film/glass sheet by ethanol, and peeling off the MSTF/PVDF film from the glass sheet. Subsequently, transfer the MSTF/PVDF film onto AAO membrane (0.1 cm-4.7 cm in diameter). Finally, the PVDF film in MSTF/PVDF film/AAO membrane was removed by N-methyl-pyrrolidone (NMP), follow by UV ozone clean for 15 min-30 min to remove the PVDF film and the organics. After that, a porous membrane which includes the AAO membrane and the MSTF with perpendicular mesopore channels freely standing on the AAO membrane was obtained.

Example 3: Characterization of a Dual-Layer MSTF/AAO Membrane by Scanning Electron Microscope (SEM)

Top-view and edge-view micrographs were taken on a field emission scanning electron microscope (SEM) (Hitachi S-4800) operated at accelerating voltages of 5 kV and 15 kV, respectively. The samples were loaded onto a plate holder with conducting carbon tape adhered at the bottom and silver paint coated at the edges of membranes. The whole specimen was baked at 80° C. overnight prior to SEM imaging.

Figures 3A, 3B, 3C:
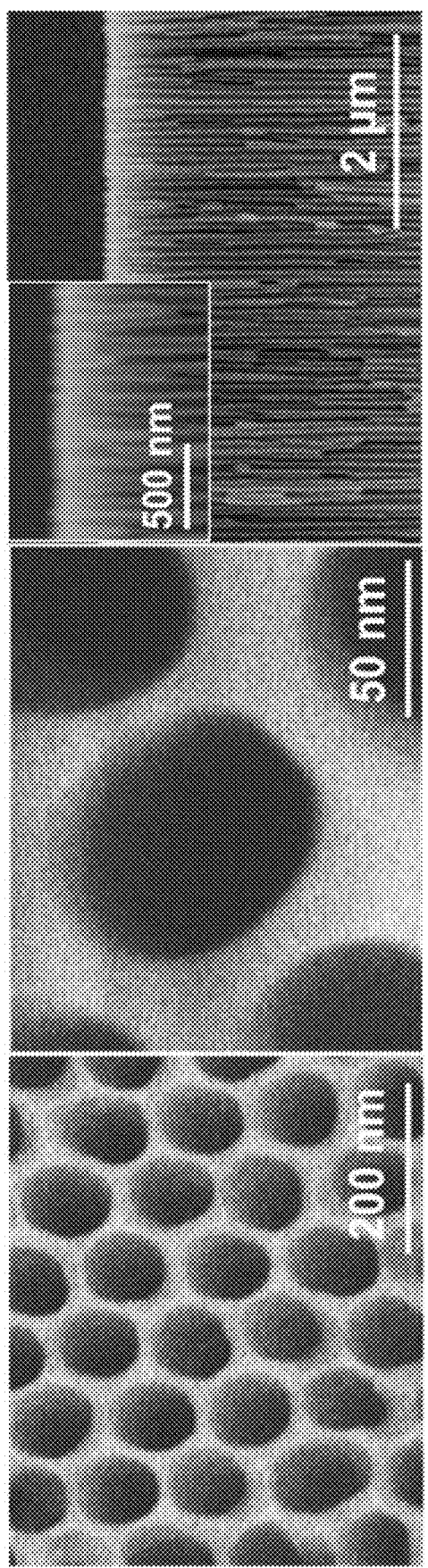
FIGS. 3A-3B respectively show top-view scanning electron microscopy (SEM) images of a single-layer AAO membrane.
FIG. 3C shows a side-view SEM image of a single-layer AAO membrane.
Figures 4A, 4B, 4C:
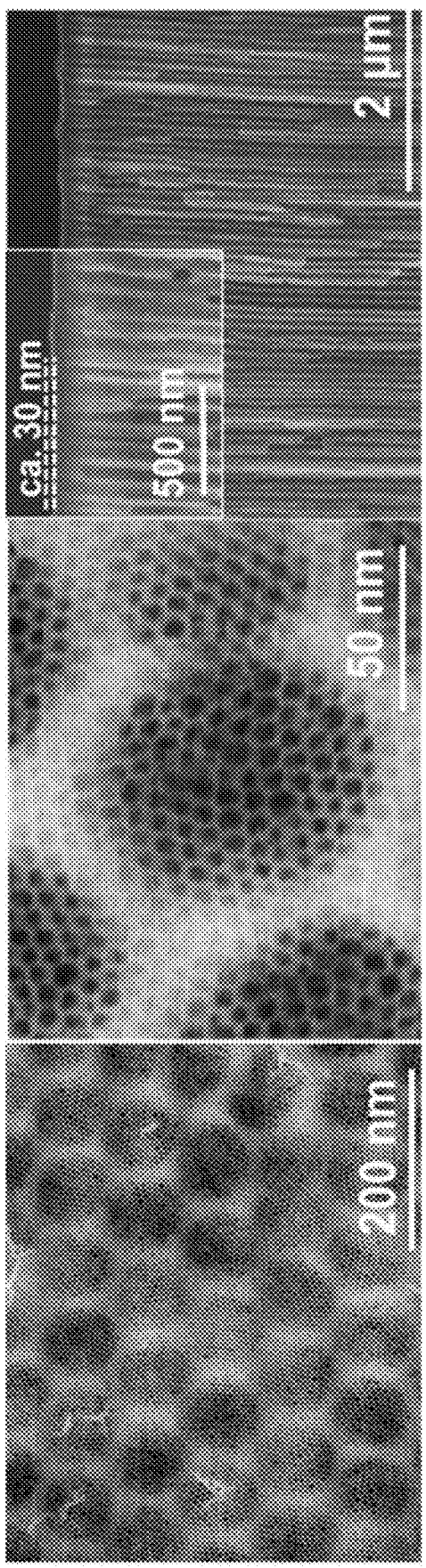
FIGS. 4A-4B respectively show top-view SEM images of a dual-layer MSTF/AAO membrane.
FIG. 4C shows a side-view SEM image of a dual-layer MSTF/AAO membrane.

FIGS. 3A-3B respectively show top-view SEM images of a single-layer AAO membrane. FIG. 3C shows a side-view SEM image of a single-layer AAO membrane. FIGS. 4A-4B respectively show top-view SEM images of a dual-layer MSTF/AAO membrane. FIG. 4C shows a side-view SEM image of a dual-layer MSTF/AAO membrane. The top-view SEM images of the single-layer AAO membrane (FIGS. 3A, 3B) and the top-view SEM images of the dual-layer MSTF/AAO membrane (FIGS. 4A, and 4B) confirm that the continuous regime of the MSTF of MSTF/AAO showed no apparent defects. Centimeter-size MSTF in MSTF/AAO can be routinely prepared with optically uniformity. A magnified top-view SEM image (FIG. 4B) reveals the single-layer MSTF with hexagonally arranged nanopores cover on both the wall and macrospores of AAO membrane. A side-view SEM image (FIG. 4C) of the MSTF/AAO reveals AAO with uniform perpendicular channels (thickness of 60 μm), while MSTF with uniform thickness of about 30 nm.

Example 4: Characterization of a Dual-Layer MSTF/AAO Membrane by Grazing Incidence Small Angle X-Ray Scattering (GISAXS)

The incidence X-ray energy of 12 keV (1.033 Å) and the sample-to-detector distance of 3.10 m result in a q-range of 0.005540-0.2853 Å$^{-1}$ that is equivalent to real space distance of 2.2-113 nm. The incidence angle of each X-ray beam varied between 0.1° and 0.3°. The scattering data extraction was performed in an X-ray scattering image analysis package (POLAR). Alternatively, in-house scattering was conducted by a grazing-incidence geometry (Nano-Viewer, Rigaku) with a two dimensional (2D) area detector (Rigaku, 100K PILATUS). The instrument is equipped with a 31 kW mm$^{-2}$ generator (rotating anode X-ray source with a Cu Kα radiation of λ=0.154 nm). The scattering vector, q (q=4π/λ sin θ), along with the scattering angles θ in these patterns were calibrated using silver behenate. The mesoporous silica thin film with perpendicular mesopore channels was mounted on a z-24 axis goniometer with an incident angle of 0.1°-0.3°.

Figure 6:
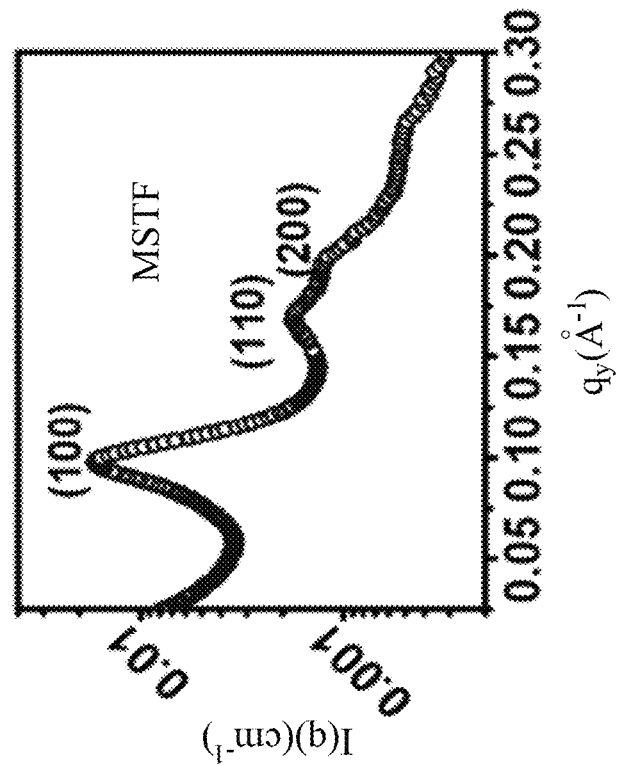
FIG. 6 shows 1D intensity profile plotted against $q_y$ for the GISAXS pattern of MSTF.
Figure 5:
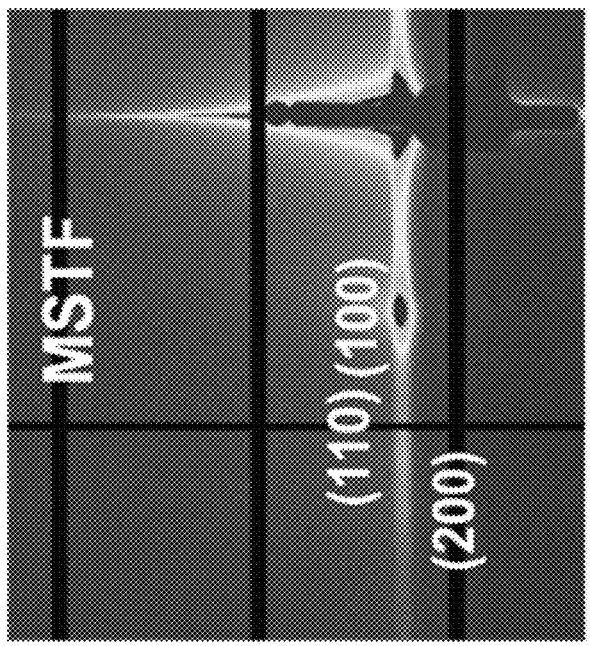
FIG. 5 shows 2D grazing-incidence small-angle X-ray scattering (GISAXS) scattering profile of MSTF.

The perpendicular mesopore channels over the entire membrane were further characterized by 2D grazing-incidence small-angle X-ray scattering (GISAXS). FIG. 5 shows 2D GISAXS scattering profile of MSTF. The 2D GISAXS patterns show three prominent spots on the left and right of the grazing-incidence X-ray beam, respectively. It indicates the highly ordered perpendicular mesopore nanochannel features of mesoporous silica thin films. FIG. 6 shows 1D intensity profile plotted against $q_y$ for the GISAXS pattern of MSTF. The 1D intensity profile shows three peaks, assigned to the 100, 110, and 200 reflections of a 2D hexagonal symmetry with the space group p6 mm, as well as evidence the perpendicular orientation of MSTF above substrates. The (100) peak is found to correspond with an averaged d-spacing of 6.87 nm, account for a pore to pore center distance of 7.94 nm, which agrees with the SEM results (FIGS. 4A, 4B, and 4C) with average pore size of about 5.8 nm and pore wall size of about 2.2 nm.

Example 5: Use of a Dual-Layer MSTF⊥AAO Membrane as a Dendrite-Resistant and Thermostable Battery Separator for Li—Li Metal Battery (1) Electrochemical Measurement Lithium plating/stripping through separator in lithium metal batteries were used to evaluate the electrochemical properties of sample as separator. A pair of Li metal anodes (300 μm thick, Ø11 mm) was used in Li—Li symmetric cells. Li and Cu foil (10 μm thick, UBIQ technology Co., LTD) were used in Li—Cu asymmetric cells. These cells were fabricated in a CR2023 coin cell with a battery separator including Celgard® 2325 (polypropylene (PP)/polyethylene (PE)/polypropylene (PP)) (Celgard LLC., USA), AAO, and MSTF⊥AAO, respectively. The electrolytes were 1 M lithium bis(trifluoromethane sulfonyl)imide (LiTFSI, 99.0%, Acros organics) in 1:1 (v/v) solution of 1,2-dimethoxyethane (DME, anhydrous, 99.5%, Sigma-Aldrich)/1,3-dioxolane (DOL, anhydrous, Sigma-Aldrich). Cycling processes were carried out by using an Arbin Battery Tester (Model BT 2043, Arbin Instruments Corp., USA) with various current densities ranging from 2 mA/cm$^2$ to 20 mA/cm$^2$. Each charge and discharge time was set as 30 min. LiFePO$_4$ (LFP, L &F Co., Ltd in Korea.)—carbon cathode materials used in Li-LFP batteries were made from a slurry consisting of 80 wt % LFP, 10 wt % carbon black (Super-P Li, Timcal Inc.), and 10 wt % polyvinylidene fluoride (PVDF, Kynar 2801) binder mixed with anhydrous N-methyl-2-pyrrolidone (NMP, Sigma-Aldrich) and stirred overnight. The LFP loading was 4-5 mg/cm$^2$. Li metal is against to MSTF side of MSTF⊥AAO separator. Li-LFP batteries were assemble by sandwiching the Celgard® 2325 (polypropylene (PP)/polyethylene (PE)/polypropylene (PP)) or MSTF⊥AAO separator. The Li-LFP cells were cycled at a 0.5 C rate (1C=177 mA g$^{-1}$) at room temperature. The battery performance was conducted at various C rates of 0.1 C, 0.25 C, 0.5 C, 1 C, and then 0.1 C between 3.0 and 3.8 V. All the cells were assembled in an Ar-filled glove box with O$_2$ and H$_2$O content below 1.0 ppm. Electrochemical impedance spectroscopy (EIS) measurements were conducted at open circuit potential (OCP) after 0th, 4th, 50th, 150th and 200th cycle using an frequency analyzer (Solartron 1255, AMETEK) in a frequency range from 0.01 Hz to 1 MHz with an amplitude of 10 mV and a potentiostat (Solartron 1287, AMETEK).

(2) Dendrite-Resistant Effect of MSTF⊥AAO as a Li Battery Separator

In consideration of the well-defined porous structure and thermostability of MSTF/AAO, applied as a dendrite-resistant and thermostable separator for lithium metal battery was investigated. The MSTF with well-defined mesopore size (5.4±0.4 nm) and uniform vertical nanochannels was expected to block the growth of Li dendrite and allow the Li$^+$ transportation between electrodes.

Figure 7:
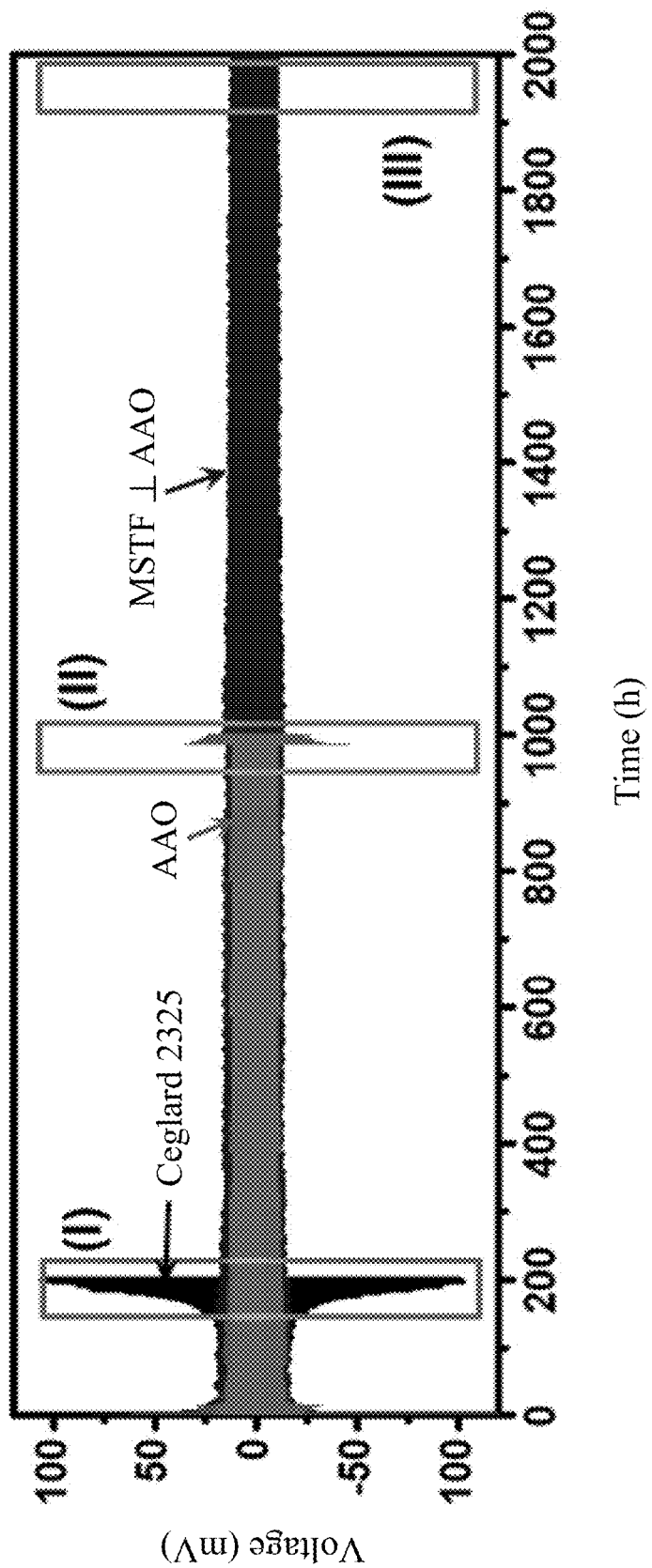
FIG. 7 shows the galvanostatic cycling performance of Li—Li symmetric cells with Celgard® 2325 (polypropylene (PP)/polyethylene (PE)/polypropylene (PP)), bare AAO, and MSTF⊥AAO separator, respectively, cycled at a fixed current density of 2 mA cm$^{-2}$ and a capacity of 1 mAh cm$^{-2}$.
Figures 8A, 8B, 8C:
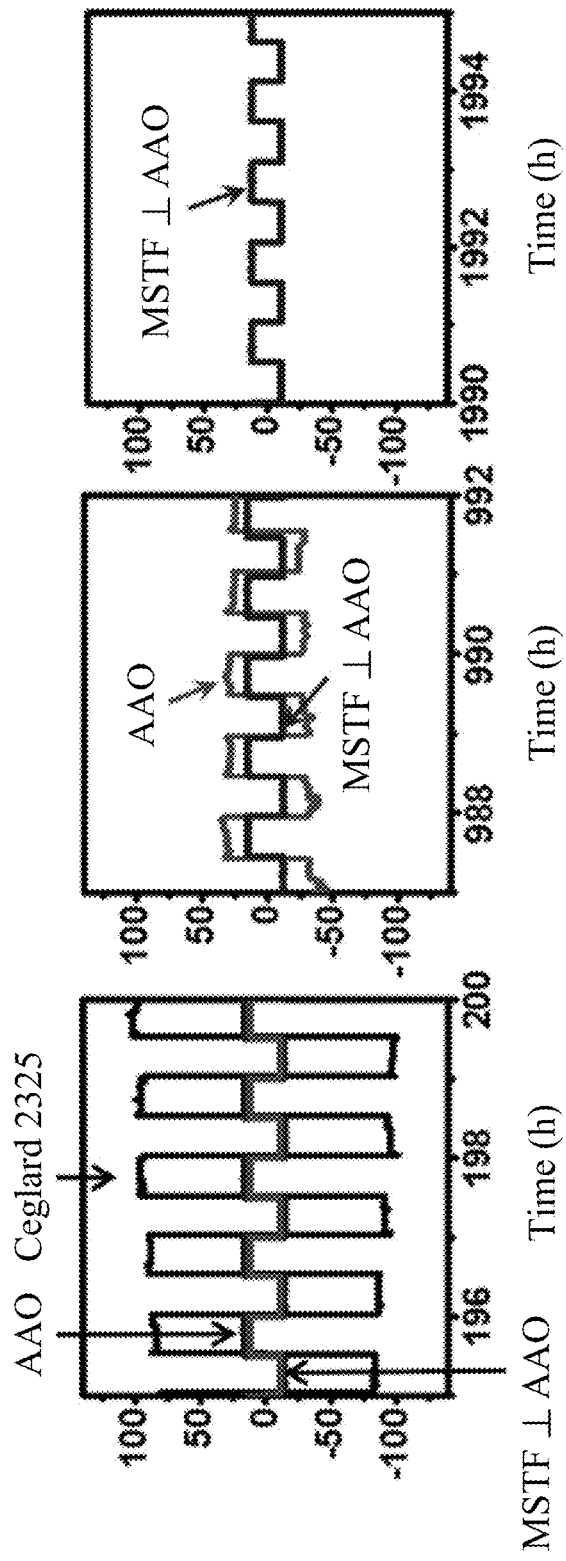
FIGS. 8A-8C respectively show the galvanostatic cycling profiles of cycling regions (I)-(III) in FIG. 7.

In order to examine the performance of MSTF⊥AAO nanoporous separator on the Li electrodeposition, the behavior of Li electroplating and electrostripping with the nanoporous separator were investigated by using galvanostatic cycling of Li—Li symmetric cells in the liquid electrolyte. FIG. 7 shows the galvanostatic cycling performance of Li—Li symmetric cells with Celgard® 2325 (polypropylene (PP)/polyethylene (PE)/polypropylene (PP)), bare AAO, and MSTF⊥AAO separator, respectively, cycled at a fixed current density of 2 mA cm$^{-2}$ and a capacity of 1 mAh cm$^{-2}$ to mimic operation of Li plating/stripping in a Li metal battery. The electrolyte is 1M LiTFSI in a 1:1 (v/v) solution of DOL/DME. FIGS. 8A-8C respectively show the galvanostatic cycling profiles of cycling regions (I)-(III) in FIG. 7. As shown in FIG. 8A, the voltage profiles obtained in Li—Li symmetric cell with Celgard® 2325 (polypropylene (PP)/polyethylene (PE)/polypropylene (PP)) separator exhibit an increase in overpotential of Li plating/stripping in less than 200 h of operation which is attributed to the instability of Li/electrolyte interfaces. As shown in FIG. 8B, the cell with bare AAO separator with a pore size of 70 nm shows an overpotential of about 25 mV and the voltage for the Li plating/stripping increases in about 1000 h of operation. The cycling performance of Li—Li symmetric cells with Celgard® 2325 (polypropylene (PP)/polyethylene (PE)/polypropylene (PP)) and AAO separator are consistent with previous results. In comparison, FIG. 8C shows that the cell with MSTF⊥AAO separator gives an excellent cycle performance under the same conditions. The Li plating/stripping occurred at a lower overpotential (about 12 mV). The voltage profiles maintain low overpotential and stable voltage polarization without short circuit for more than 2000 h of operation, suggesting that Li cycling is highly stable and reversible with MSTF⊥AAO separator. Thus Li dendrite growth is dramatically suppressed in the presence of MSTF⊥AAO separator.

Figure 9A:
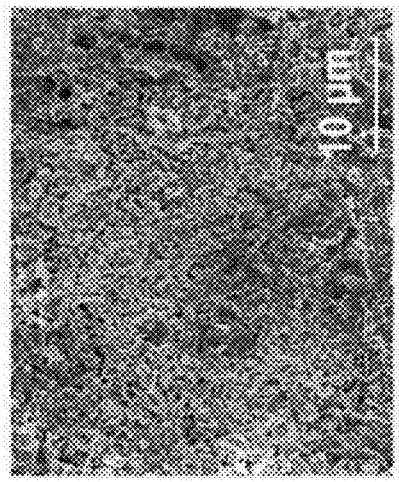
FIGS. 9A and 9B show surface SEM images of Li metal cycled in a Li—Li symmetric cell with Celgard® 2325 (polypropylene (PP)/polyethylene (PE)/polypropylene (PP)) separator at a fixed current density of 2 mA cm$^{-2}$ and a capacity of 1 mAh cm$^{-2}$ after 200 repeated Li plating-stripping cycles.
Figure 9B:
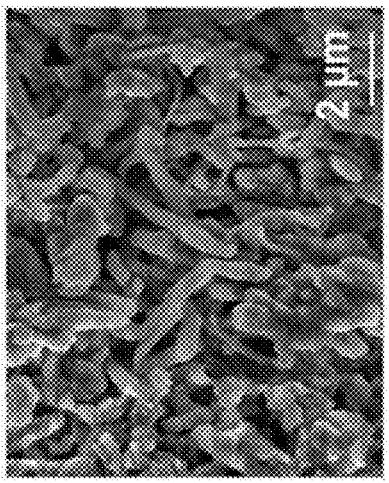
Figure 9C:
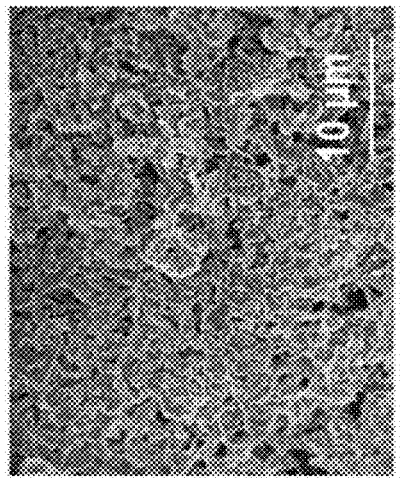
FIGS. 9C and 9D show surface SEM images of Li metal cycled in a Li—Li symmetric cell with bare AAO separator at a fixed current density of 2 mA cm$^{-2}$ and a capacity of 1 mAh cm$^{-2}$ after 400 repeated Li plating-stripping cycles.
Figure 9D:
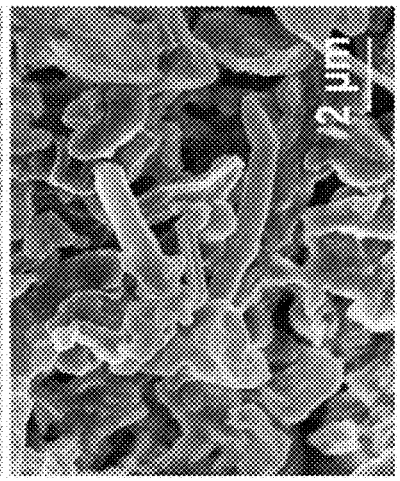

To investigate the morphology of Li metal with different separators during Li plating/stripping process, SEM observation of the morphologies of Li metal surface after cycles was performed. FIGS. 9A and 9B show surface SEM images of Li metal cycled in a Li—Li symmetric cell with Celgard® 2325 (polypropylene (PP)/polyethylene (PE)/polypropylene (PP)) separator at a fixed current density of 2 mA cm$^{-2}$ and a capacity of 1 mAh cm$^{-2}$ after 200 repeated Li plating-stripping cycles. FIGS. 9C and 9D show surface SEM images of Li metal cycled in a Li—Li symmetric cell with bare AAO separator at a fixed current density of 2 mA cm$^{-2}$ and a capacity of 1 mAh cm$^{-2}$ after 400 repeated Li plating-stripping cycles. FIGS. 9E and 9F show surface SEM images of Li metal cycled in a Li—Li symmetric cell with MSTF⊥AAO separator at a fixed current density of 2 mA cm$^{-2}$ and a capacity of 1 mAh cm$^{-2}$ after 400 repeated Li plating-stripping cycles. Each plating and stripping step takes 30 min long. The Li metal in the cells stopped at the end of the stripping process was used for the SEM measurements. The electrolyte is 1M LiTFSI in a 1:1 (v/v) solution of DOL/DME. As shown in FIGS. 9A-9D, SEM images of Li metal surface cycled with Celgard® 2325 (polypropylene (PP)/polyethylene (PE)/polypropylene (PP)) and AAO separators show extensive appearance of micrometer-sized and tree-like structures, suggesting the formation of Li dendritic structure after cycling. In contrast, as shown in FIGS. 9E and 9F, Li metal cycled with MSTF⊥AAO separator with Li contact to MSTF side shows smooth and uniform morphology which is correlated to stable Li cycling performance obtained in the Li—Li symmetric cell.

In addition, the galvanostatic Li cycling experiments at higher current densities to further evaluate the electrochemical compatibility of MSTF⊥AAO membrane with the Li metal were performed. FIG. 10A shows the galvanostatic cycling performance of Li—Li symmetric cells with bare AAO and MSTF⊥AAO, respectively, cycled at a fixed current density of 3 mA $cm^{-2}$ and a capacity of 1.5 mAh $cm^{-2}$ The voltage profiles obtained with MSTF⊥AAO separator maintain lower overpotentials (15 mV-25 mV) in comparison with AAO separator (150 mV-230 mV) for more than 2000 h. FIG. 10B shows the galvanostatic cycling performance of Li—Li symmetric cells with bare AAO and MSTF⊥AAO, respectively, cycled at a fixed current density of 10 mA $cm^{-2}$ and a capacity of 5 mAh $cm^{-2}$. MSTF⊥AAO separator could maintain steady cycles for more than 1600 h of operation without a dendrite-induced short circuit while overpotential obtained with AAO separator suddenly drops after approximately 1100 h of cycling which is attributed to short circuits. FIG. 10C shows the galvanostatic cycling performance of Li—Li symmetric cells with bare AAO and MSTF⊥AAO, respectively, cycled at a fixed current density of 20 mA $cm^{-2}$ and a capacity of 10 mAh $cm^{-2}$. For such extremely high current density, stable Li cycling can even be achieved with MSTF⊥AAO separator for over 400 h with low overpotential of 100 mV-145 mV. The overpotential obtained with the corresponding AAO separator increases with cycles and shorts at about 135 h of cycling. Overall, the cells cycled with MSTF⊥AAO separator exhibit lower overpotential and better cycling performance than the cells cycled with AAO separator. Thus, the superior cyclability of the cell with MSTF⊥AAO separator implies a homogeneous Li deposit and less consumption of both Li and electrolyte occurring in the cell.

Figures 11, 12:
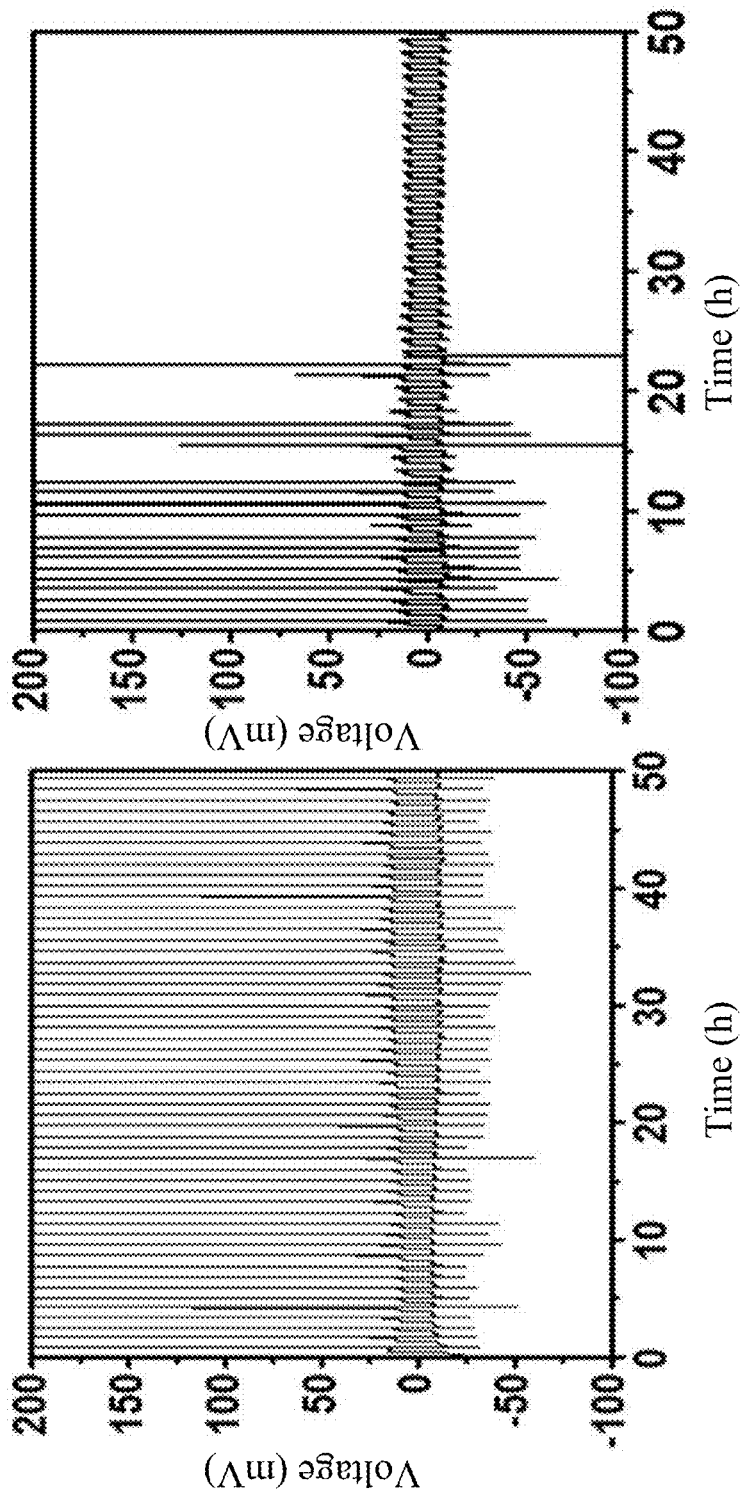
FIG. 11 shows the galvanostatic cycling measurement of Li—Cu asymmetric cell with AAO separator cycled at a fixed current density of 0.5 mA cm$^{-2}$ and a capacity of 0.25 mAh cm$^{-2}$.
FIG. 12 shows the galvanostatic cycling measurement of Li—Cu asymmetric cell with MSTF⊥AAO separator cycled at a fixed current density of 0.5 mA cm$^{-2}$ and a capacity of 0.25 mAh cm$^{-2}$.
Figure 13:
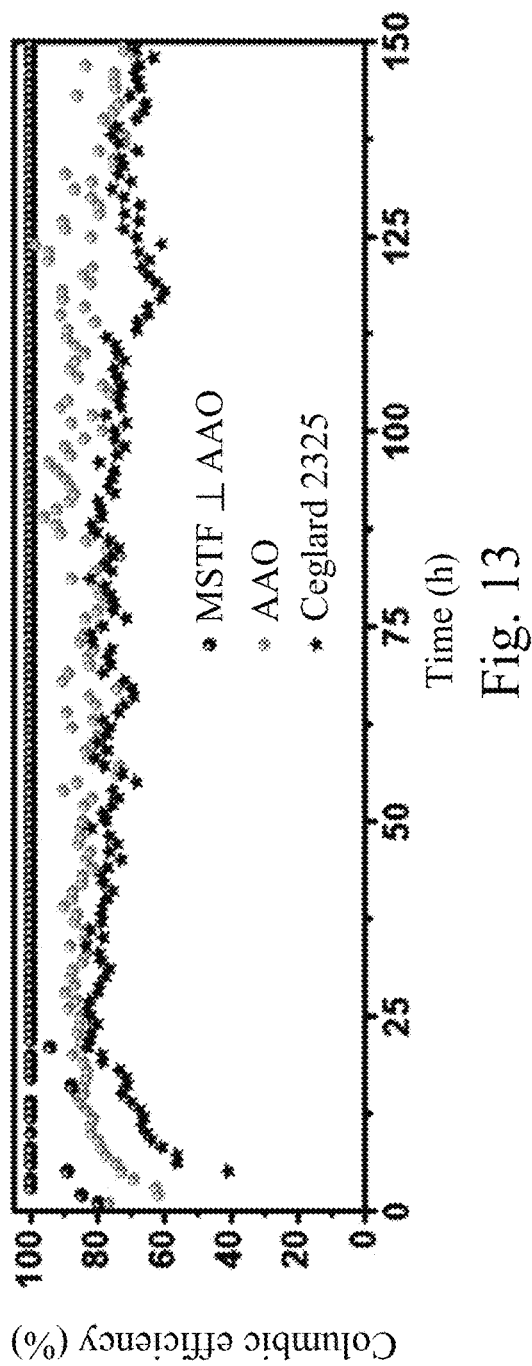
FIG. 13 shows the coulombic efficiency of Li—Cu asymmetric cells with bare AAO, MSTF⊥AAO, and Celgard 2325, respectively, cycled at a fixed current density of 0.5 mA cm$^{-2}$ and a capacity of 0.25 mAh cm$^{-2}$.
Figure 14:
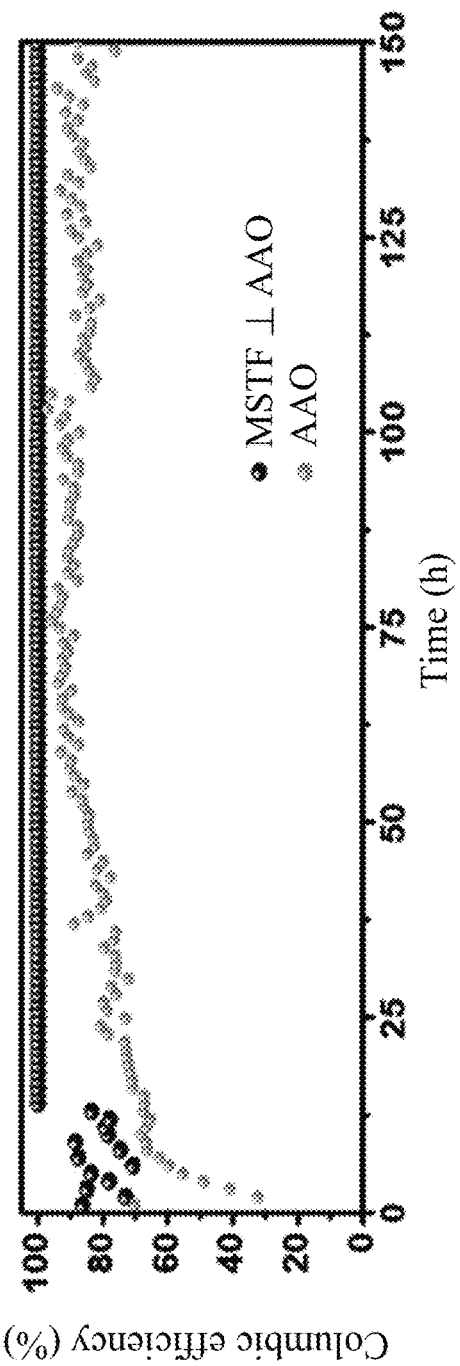
FIG. 14 shows the coulombic efficiency of Li—Cu asymmetric cells with bare AAO and MSTF⊥AAO, respectively, cycled at a fixed current density of 2 mA cm$^{-2}$ and capacity of 1 mAh cm$^{-2}$.

Example 6: Use of a Dual-Layer MSTF⊥AAO Membrane as a Dendrite-Resistant and Thermostable Separator for Li—Cu Metal Battery Cycling performance of Li—Cu asymmetric cells with MSTF⊥AAO separator can be used to quantify the stability of Li plating/stripping behavior resulted from the electrolyte/separator assembly. FIG. 11 shows the galvanostatic cycling measurement of Li—Cu asymmetric cell with AAO separator cycled at a fixed current density of 0.5 mA $cm^{-2}$ and a capacity of 0.25 mAh $cm^{-2}$. FIG. 12 shows the galvanostatic cycling measurement of Li—Cu asymmetric cell with MSTF⊥AAO separator cycled at a fixed current density of 0.5 mA $cm^{-2}$ and a capacity of 0.25 mAh $cm^{-2}$. The electrolyte is 1M LiTFSI in a 1:1 (v/v) solution of DOL/DME. Cu is against MSTF side in cells with MSTF⊥AAO separators. FIG. 13 shows the coulombic efficiency of Li—Cu asymmetric cells with bare AAO, MSTF⊥AAO, and Celgard 2325, respectively, cycled at a fixed current density of 0.5 mA $cm^{-2}$ and a capacity of 0.25 mAh $cm^{-2}$. As shown in FIG. 13, the fluctuation of coulombic efficiency of the cells cycled with AAO separator and Celgard 2325 suggest that solid electrolyte interphase (SEI) formation and Li plating/stripping behavior is not stable during cycling. In contrast, the cells with MSTF⊥AAO separator exhibit a lower coulombic efficiency of 60-100% at initial cycles, suggesting that the formation of stable SEI occurs in the first 20 cycles. The coulombic efficiency then researches >99.9% in long cycle life of 150 cycles (after $25^{th}$). FIG. 14 shows the coulombic efficiency of Li—Cu asymmetric cells with bare AAO and MSTF⊥AAO, respectively, cycled at a fixed current density of 2 mA $cm^{-2}$ and capacity of 1 mAh $cm^{-2}$. As shown in FIG. 14, improved cycling performance of Li—Cu asymmetric cells with MSTF⊥AAO separators can also be observed even at higher current density and capacity, which demonstrates reliability of MSTF⊥AAO separators for Li metal battery application.

Figure 15:
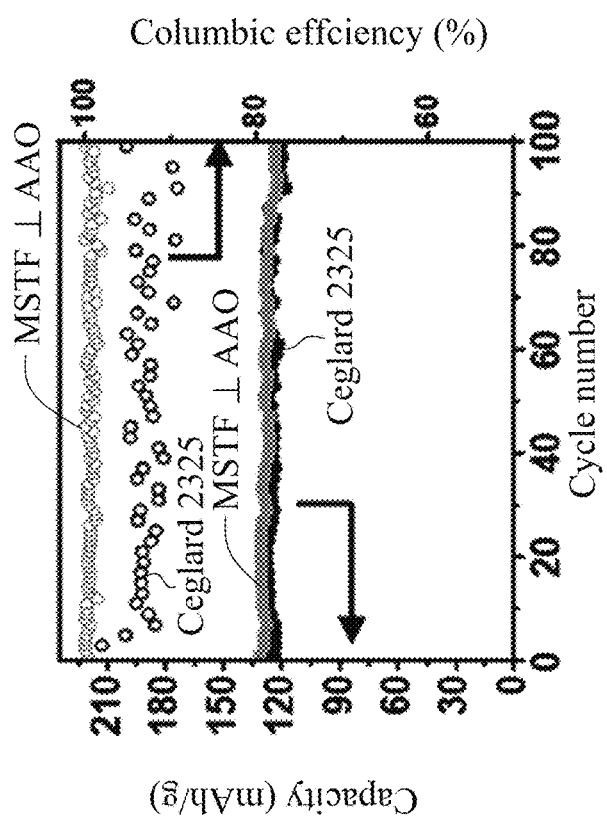
FIG. 15 shows the cycling performance of Li/LFP batteries with Celgard® 2325 (polypropylene (PP)/polyethylene (PE)/polypropylene (PP)) separator and MSTF⊥AAO separator, respectively, cycled at 0.5 C rate.
Figure 16:
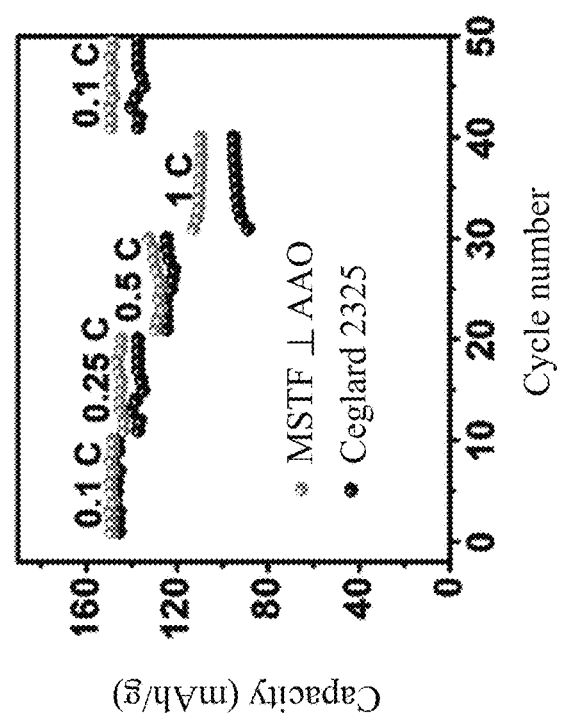
FIG. 16 shows the cycling performance of Li/LFP batteries with Celgard® 2325 (polypropylene (PP)/polyethylene (PE)/polypropylene (PP)) separator and MSTF⊥AAO separator, respectively, cycled at various C-rates.

Example 7: Use of a Dual-Layer MSTF⊥AAO Membrane as a Dendrite-Resistant and Thermostable Separator for LFP Full Cell Battery Next, a full cell test of Li metal batteries with lithium metal anode, LFP cathode, and separators including MSTF⊥AAO were conducted. FIG. 15 shows the cycling performance of Li/LFP batteries with Celgard® 2325 (polypropylene (PP)/polyethylene (PE)/polypropylene (PP)) separator and MSTF⊥AAO separator, respectively, cycled at 0.5 C rate. An initial specific capacity of 135 mA h $g^{-1}$ was observed after the first cycles, and a specific capacity of 130 mAh $g^{-1}$ was still maintained after 100 cycles with the coulombic efficiency up to 99.9%, demonstrating that Li-metal, MSTF⊥AAO, and liquid electrolytes are compatible under higher-voltage conditions. Meanwhile, the coulombic efficiency is lower in Li/LFP batteries with MSTF⊥AAO as separator than that of Celgard® 2325 (polypropylene (PP)/polyethylene (PE)/polypropylene (PP)) as separator (ca 97%). Furthermore, FIG. 16 shows the cycling performance of Li/LFP batteries with Celgard® 2325 (polypropylene (PP)/polyethylene (PE)/polypropylene (PP)) separator and MSTF⊥AAO separator, respectively, cycled at various C-rates. It displays a capacity of 111 mA h $g^{-1}$ at 1 C, whereas the capacities obtained from the cells with Celgard® 2325 (polypropylene (PP)/polyethylene (PE)/polypropylene (PP)) shows a significant decrease of the specific capacity of 94 mA h $g^{-1}$ at 1 C, suggesting that the MSTF⊥AAO separator can significantly improves charge-discharge rate performance of Li metal batteries. From these results, one can see the great potential in our MSTF based separator towards the goal of stable lithium anode for long-term high power application. Intense optimizations toward materials stability and high current density of the novel separator.

Examples 1-7 describe a porous membrane, MSTF⊥AAO, including a AAO membrane with macropores and a MSTF with perpendicular mesopore channels thereon was applied as a battery separator for dendrite-resistant Li batteries. The MSTF is a centimeter-size continuous membrane. Excellent cycling performance can be achieved in Li—Li cells with the MSTF⊥AAO separator cycled at ultrahigh current densities such as 10 mA $cm^{-2}$ for more than 1600 h of operation. Also, MSTF⊥AAO separator results in the extremely high coulombic efficiency of >99.9% in Li—Cu cells cycled at a high current density of 2 mA $cm^{-2}$ and a capacity of 1 mAh $cm^{-2}$ for more than 150 h of cycling. Full-cell Li metal battery tests suggest that MSTF⊥AAO membrane can be used to achieve safe Li metal batteries.

Based on the above, the present disclosure provides a battery including a porous membrane as a battery separator and a method of fabricating a porous membrane. The porous membrane includes a macroporous substrate and a mesoporous silica thin film (MSTF) with perpendicular mesopore channels, wherein the MSTF is positioned on the macroporous substrate. The MSTF fabricated by the method is free of cracking defects and has uniform perpendicular mesoporous channels. The battery separator can stabilize electrodeposition of reactive metals at the anode/electrolyte interface, thereby resisting, impeding, suppressing, and/or preventing dendrite growth. The battery of the present disclosure can exhibit good dendrite-resistant ability and long-term stability under various current densities, and is thermostable.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A battery, comprising:
an anode;
a cathode; and
a battery separator positioned between the anode and the cathode, the battery separator comprising: a macroporous substrate and a mesoporous silica thin film (MSTF) with perpendicular mesopore channels that are perpendicular to a first upper surface of the MSTF, wherein the MSTF is positioned on a second upper surface of the macroporous substrate, and a lower surface of the macroporous substrate is free of being covered by an additional MSTF.

2. The battery of claim 1, wherein the battery is a lithium battery or a rechargeable lithium battery.

3. The battery of claim 1, wherein each mesopore channel of the MSTF has a pore size of more than or equal to about 2 nm, and less than or equal to about 10 nm.

4. The battery of claim 1, wherein the MSTF has a thickness of more than or equal to about 10 nm, and less than or equal to about 100 nm.

5. The battery of claim 1, wherein the MSTF has an area of more than or equal to about 0.5 cm$^2$, and less than or equal to about 100 cm$^2$.

6. The battery of claim 1, wherein the macroporous substrate has macropores, and the macropores have an average pore diameter of more than or equal to about 20 nm, and less than or equal to about 1 μm.

7. The battery of claim 1, wherein the macroporous substrate has a thickness of more than or equal to about 10 nm, and less than or equal to about 1 mm.

8. The battery of claim 1, wherein the macroporous substrate comprises an inorganic material, a metal, a polymer, or a combination thereof.

9. The battery of claim 8, wherein the inorganic material is selected from the group consisting of aluminum oxide, zirconia, titania, magnesia, spinel, calcia, cordierite, zeolite, mullite, ferrite, zinc oxide, silicon carbide, aluminum nitride, silicon nitride, titanium carbide, tungsten carbide, barium titanate, boron carbide, kaolin, and hydroxyapatite.

10. The battery of claim 8, wherein the inorganic material comprises an anodic aluminum oxide (AAO).

11. The battery of claim 8, wherein the polymer is selected from the group consisting of polyvinylidene fluoride (PVDF), polyvinyl chloride (PVC), polyacrylonitrile (PAN), polymethyl methacrylate (PMMA), polyoxyethylene (PEO), polyamide (PAI), polytetrafluoroethylene (PTFE), and rubber.

* * * * *